No. 723,057. PATENTED MAR. 17, 1903.
U. P. SMITH.
METHOD OF MANUFACTURING PNEUMATIC TIRES.
APPLICATION FILED DEC. 10, 1902.
NO MODEL.
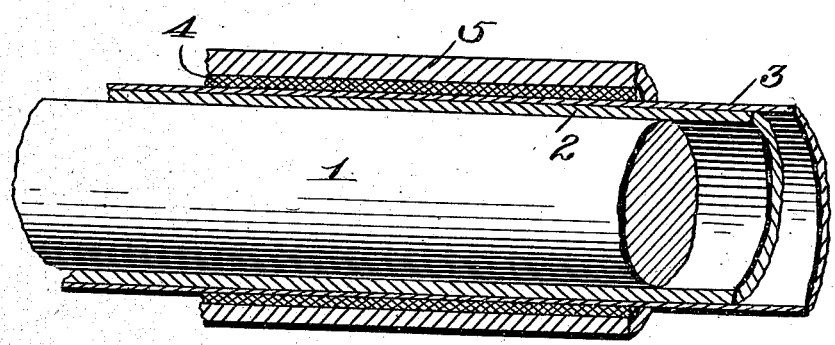
Witnesses:
C. D. Kesler.
James L. Norris, Jr.
Inventor
Uzziel P. Smith
By
James L. Norris.
Atty.

UNITED STATES PATENT OFFICE.

UZZIEL P. SMITH, OF CHICAGO, ILLINOIS, ASSIGNOR TO FRANK A. SEIBERLING, OF AKRON, OHIO.

METHOD OF MANUFACTURING PNEUMATIC TIRES.

SPECIFICATION forming part of Letters Patent No. 723,057, dated March 17, 1903.

Application filed December 10, 1902. Serial No. 134,688. (No model.)

*To all whom it may concern:*

Be it known that I, UZZIEL P. SMITH, a citizen of the United States, residing at Chicago, in the county of Cook and State of Illinois, have invented new and useful Improvements in Methods of Manufacturing Pneumatic Tires, of which the following is a specification.

My invention relates to the manufacture of a pneumatic tire having an inner separate continuous air-tube and an outer sheath or cover, and has for its object an improved method of manufacturing the tire, whereby the same may be vulcanized complete in a single operation without causing the contiguous surfaces of the tube and sheath to adhere.

According to my invention I interpose between the inner tube and the outer surrounding sheath before vulcanization a fugitive separating medium which will prevent adhesion of the two parts of the tire during the vulcanizing operation, but which will itself be thereby dissipated or have its character as a separate envelop or layer destroyed by incorporation with the tire-bodies, so that at the conclusion of the vulcanizing operation there will exist as distinct elements of the tire only the inner air-tube and the outer sheath or cover. The substance or material which I prefer to employ as a separating medium is tissue-paper; but manifestly any other substance or material which will accomplish the purpose had in view would be within the purview of my invention.

In order to render the invention and the method of procedure clear, I have illustrated in the accompanying drawing a simple manner of carrying out the same, the figure showing a mandrel in elevation and the parts of a tire and the interposed separating medium in section.

In proceeding according to my invention I first place about the mandrel 1 a layer of rubber 2 to form the inner air-tube, and this layer of rubber may have applied to it, if desired, a layer of fabric or "friction-cloth" in the ordinary manner. Around this inner tube 2 I next apply a single layer of tissue-paper 3, preferably by winding the paper spirally about the tube, and then about the paper is placed a layer of friction-cloth 4, which in turn is surrounded by a layer of rubber 5, the layers 4 and 5 when the tire is vulcanized uniting to form the outer sheath or cover, as is well understood. The various layers being assembled in the manner described, the ends of the tire are telescoped in the usual manner practiced in forming a continuous single-tube tire, and the tire is then vulcanized. I find that by the vulcanizing process the tissue-paper is caused to adhere to or become incorporated with the contiguous surface portions of the layers between which it is introduced, which in the present case is the inner tube 2 and the friction-cloth 4, and ceases to exist as a separate individual layer, so that on the tire being cut open the inner tube 2 will be found to be entirely free from engagement with the outer sheath or cover. The paper forms a kind of fuzz on the inner surface of the outer sheath and on the outer surface of the inner air-tube.

It will of course be apparent that I could place the layer of tissue-paper or other separating material used between any other two layers of the tire. Thus, for example, the inner tube could be surrounded with a layer of friction-cloth and the paper then placed over the latter, so that it would lie between two layers of friction-cloth.

A tire may thus be constructed in a simple and economical manner in a single operation and at the same time be provided with a separate independent air-tube which may readily be repaired.

Having thus fully described my invention, what I claim as new is—

1. The method of manufacturing pneumatic tires which consists in separating two layers thereof by a fugitive material, and one which will prevent the separated layers from uniting during the vulcanizing operation, and then vulcanizing the tire.

2. The method of manufacturing pneumatic tires which consists in interposing between two of the layers thereof a material which will prevent said layers from uniting during the vulcanizing operation and itself be thereby incorporated with said layers, and then vulcanizing said tire.

3. The method of manufacturing pneumatic tires which consists in interposing between the inner air-tube and the outer sheath or cover a fugitive material and one which will prevent the said tube and cover from uniting during the vulcanizing operation, and then vulcanizing the tire.

4. The method of manufacturing pneumatic tires which consists in interposing between the inner air-tube and the outer sheath or cover a layer of tissue-paper, and then vulcanizing said tire.

In testimony whereof I have hereunto set my hand in presence of two subscribing witnesses.

UZZIEL P. SMITH.

Witnesses:
ROSE M. LEMIEUX,
FRED. S. BRIGGER.